United States Patent
Cheng et al.

(10) Patent No.: US 6,823,462 B1
(45) Date of Patent: Nov. 23, 2004

(54) VIRTUAL PRIVATE NETWORK WITH MULTIPLE TUNNELS ASSOCIATED WITH ONE GROUP NAME

(75) Inventors: Pau-Chen Cheng, Yorktown Heights, NY (US); Ajit Clarence D'Sa, Austin, TX (US); Jian Hua Feng, Austin, TX (US); Denise Marie Genty, Austin, TX (US); Jacqueline Hegedus Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 09/657,122

(22) Filed: Sep. 7, 2000

(51) Int. Cl.[7] .............................. H04L 9/00; G06F 15/16
(52) U.S. Cl. ....................... 713/201; 709/227; 709/228; 709/229
(58) Field of Search ................... 713/201; 709/200–229

(56) References Cited

U.S. PATENT DOCUMENTS

| | | | |
|---|---|---|---|
| 5,768,271 A | | 6/1998 | Seid et al. .................. 370/389 |
| 5,864,666 A | * | 1/1999 | Shrader ....................... 713/201 |
| 5,968,176 A | * | 10/1999 | Nessett et al. .............. 713/201 |
| 6,055,236 A | | 4/2000 | Nessett et al. .............. 370/389 |
| 6,079,020 A | | 6/2000 | Liu ............................. 713/201 |
| 6,092,200 A | * | 7/2000 | Muniyappa et al. ........ 713/201 |
| 6,158,010 A | * | 12/2000 | Moriconi et al. ........... 713/201 |
| 6,226,748 B1 | * | 5/2001 | Bots et al. .................. 713/201 |
| 6,408,336 B1 | * | 6/2002 | Schneider et al. .......... 709/229 |
| 6,487,600 B1 | * | 11/2002 | Lynch ......................... 709/229 |
| 6,662,221 B1 | * | 12/2003 | Gonda et al. ............... 709/223 |

OTHER PUBLICATIONS

WatchGuard, "WatchGuard VPN Guide, Watchguard Firebox System", 1998–2003, WatchGuard Technologies Inc., entire document.*

* cited by examiner

*Primary Examiner*—Ayaz Sheikh
*Assistant Examiner*—Ronald Baum
(74) *Attorney, Agent, or Firm*—Robert A. Voigt, Jr.; Mark S. Walker; Winstead Sechrest & Minick P.C.

(57) ABSTRACT

A method, network system and computer program product for establishing a server node in a virtual private network with a single tunnel definition and a single security policy for a plurality of tunnels associated with a group name. In one embodiment, a method comprises the step of configuring a group database in the server node. The group database in the server node comprises the group name and a list of members associated with the group name. The method further comprises configuring a rules database in the server node. The rules database associates the group name with a particular security policy. The method further comprises configuring a tunnel definition database in the server node. In the tunnel definition database, the remote ID is defined as the group name. In another embodiment of the present invention, the list of members associated with the group name comprises a non-contiguous list of ID types. In another embodiment of the present invention, the members associated with the group name are identified by any specified name.

66 Claims, 4 Drawing Sheets

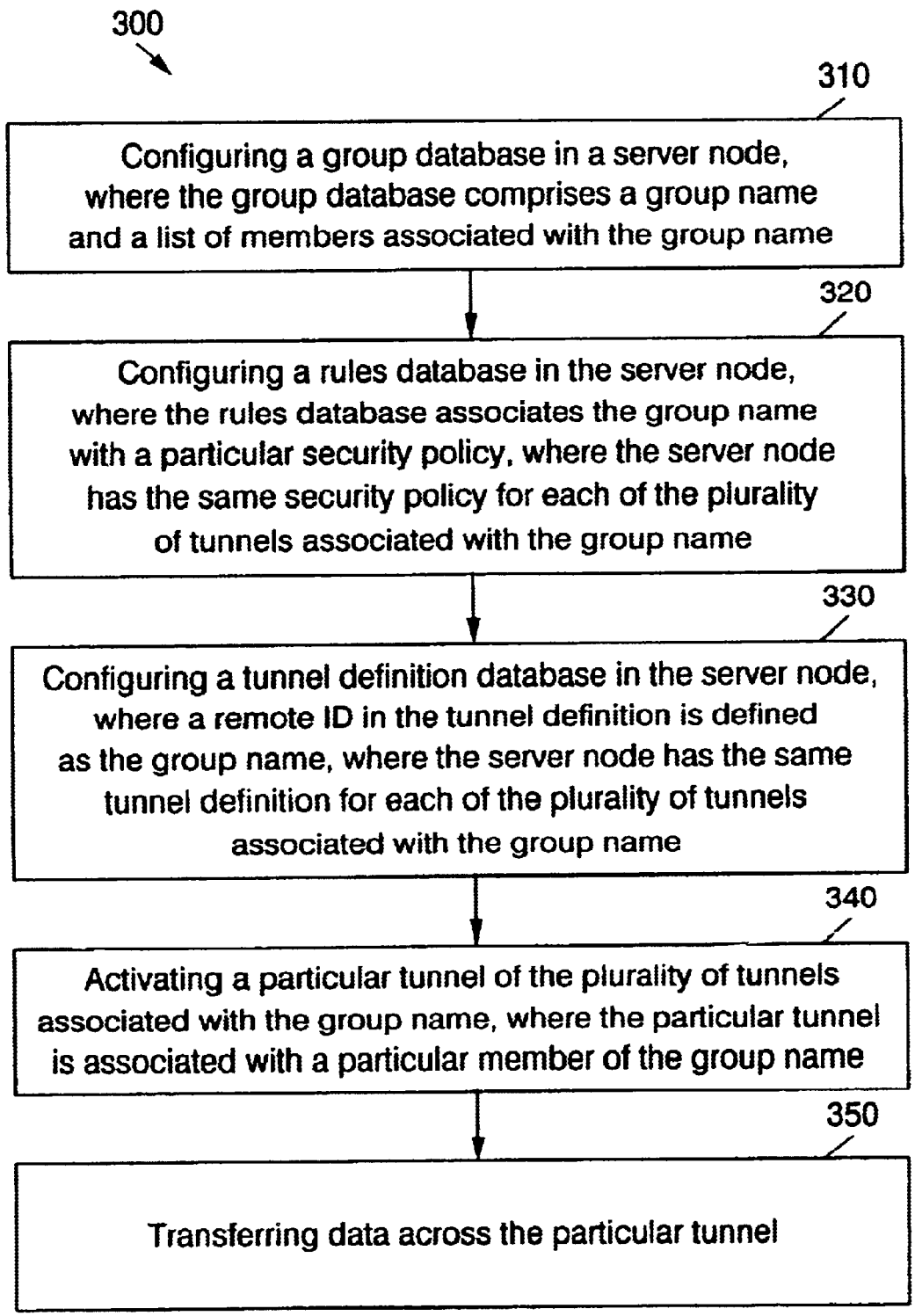

| Group Name | Member IDs | Member ID Type |
|---|---|---|
| VPNA | joe@hotmail.com<br>alice@hotmail.com | user@FQDN<br>user@FQDN |

520

| Remote ID | Remote ID Type | Security Policy Pointer |
|---|---|---|
| VPNA<br>VPNB | Group<br>Group | High-Security<br>Medium-Security |

530

| Local ID | Local ID Type | Remote ID | Remote ID Type |
|---|---|---|---|
| 12.XX.XX | IPV4_addr | VPNA | Group |

VIRTUAL PRIVATE NETWORK WITH MULTIPLE TUNNELS ASSOCIATED WITH ONE GROUP NAME

TECHNICAL FIELD

The present invention relates to the field of data communications, and more particularly to a virtual private network with multiple tunnels associated with a group of users where the server node in the virtual private network has a single tunnel definition and a single security policy for the multiple tunnels associated with the group.

BACKGROUND INFORMATION

Security is a significant concern in the communication between computer networks over a public network, e.g., institutional intranets and Internet. Public networks provide the capability for a large number of diverse users to establish communication links between each other. A series of servers and switching systems route packets of data between various users based upon addresses using communication protocols such as TCP/IP. Unfortunately, packets of data move between senders and recipients through various pathways that are unsecured, i.e., third parties may gain access to data sent between authorized senders and recipients.

One solution to secure the transfer of data between senders and recipients over a public network is through a virtual private network. A virtual private network (VPN) is an extension of an enterprise's private intranet across a public network such as the Internet, creating a secure private connection, commonly referred as a "tunnel." For example, virtual private networks may be established between an enterprise's private intranet and remote users, branch offices or business partners. The secure private connection, i.e., tunnel, is established between sites, commonly referred to as "nodes." Once the tunnel is established, data may be transmitted between nodes without the risk of interception by unauthorized users through the use of encryption, e.g., preshared keys, public keys. A preshared key is a value that is used to authenticate the nodes of a tunnel. That is, the sane preshared key must be possessed by the two nodes in order to create a tunnel between the nodes.

A virtual private network may be configured by having one node designated as the server node and a plurality of nodes designated as client nodes. Each client node is connected to the server node establishing a plurality of tunnels between the client nodes and the server node. A tunnel definition defines the end points of a tunnel thereby establishing a tunnel. A security policy describes the characteristics of protection for the transfer of information between the nodes defining the tunnel. In prior art virtual private networks, VPN's create a security policy and a tunnel definition in the server node for each of the plurality of tunnels connected to the server node thereby resulting in a large number of security policies to be created and maintained for the many users of resources on a network.

It would therefore be desirable to develop a virtual private network where the server node has one security policy and one tunnel definition associated with a plurality of tunnels where the plurality of tunnels are associated with a group, i.e., group of users. It would further be desirable to allow the users to be identified by any specified name. It would further be desirable to allow a non-contiguous set of ID types to be defined as a group.

SUMMARY

The problems outlined above may at least in part be solved in some embodiments by configuring a group database in the server node where the group database comprises a group name and a list of members associated with the group name. Furthermore, a rules database in the server node is configured. The rules database associates the group name with a particular security policy. The server node then has a single security policy for each of the plurality of tunnels associated with the group name. Furthermore, a tunnel definition database in the server node is configured. In the tunnel definition database, the remote ID is defined as the group name. The server node then has a single tunnel definition for each of the plurality of tunnels associated with the group name.

In one embodiment, a method for allowing a server node in a virtual private network to have a single tunnel definition and a single security policy for a plurality of tunnels associated with a group name comprises the step of configuring a group database in the server node. The group database comprises the group name and a list of members associated with the group name. The method further comprises configuring a rules database in the server node. The rules database associates the group name with a particular security policy. The method further comprises configuring a tunnel definition database in the server node. In the tunnel definition database, the remote ID is defined as the group name.

In another embodiment of the present invention, the list of members associated with the group name comprises a non-contiguous list of ID types, e.g., Internet Key Exchange (IKE) defined ID types such as Internet Protocol addresses, User@ Fully Qualified Domain Name (FQDN), FQDN, and X.500 Distinguished Name. In another embodiment of the present invention, the members associated with the group name are identified by any specified name.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 3 is a flowchart depicting a method for developing a virtual private network where the server node has one security policy and one tunnel definition for a plurality of tunnels associated with a group;

FIG. 5 illustrates an embodiment of a group database, a rules database and a tunnel definition database.

DETAILED DESCRIPTION

The present invention comprises a virtual private network where the server node has a single tunnel definition and a single security policy for a plurality of tunnels associated with a group name.

In one embodiment of the present invention a method comprises the step of configuring a group database in the server node. The group database comprises the group name and a list of members associated with the group name. The method further comprises configuring a rules database in the server node. The rules database associates the group name with a particular security policy. The method further comprises configuring a tunnel definition database in the server node. In the tunnel definition database, the remote ID is defined as the group name. In another embodiment of the present invention, the list of members associated with the group name comprises a non-contiguous list of ID types. In another embodiment of the present invention, the members associated with the group name are identified by any specified name.

Figure 1:
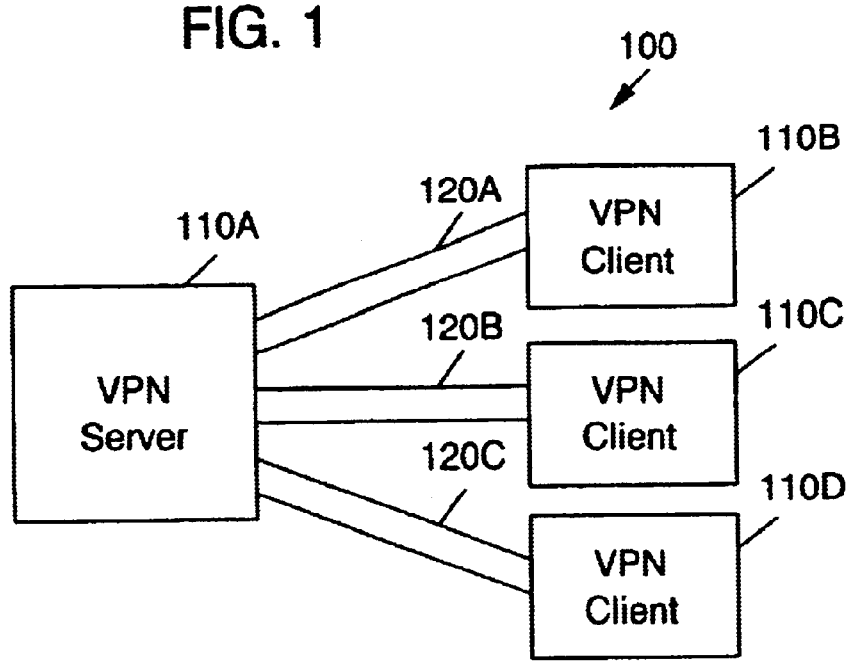
FIG. 1 illustrates an embodiment of a virtual private network.

FIG. 1—Embodiment of a Virtual Private Network

FIG. 1 illustrates an embodiment of the present invention of a virtual private network 100. As stated in the Background Information section, a virtual private network is an extension of an enterprise's private intranet across a public network such as the Internet, creating a secure private connection. The secure private connection, i.e., tunnel, is established between sites, commonly referred to as nodes. A virtual private network may be configured by having one node designated as the server node and a plurality of nodes designated as client nodes. For example, virtual private network 100 establishes tunnels 120A–C between server node 110A and client nodes 110B–D. Tunnels 120A–C may collectively or individually be referred to as tunnels 120 or tunnel 120, respectively. Nodes 110A–D may collectively or individually be referred to as nodes 110 or node 110, respectively. It is noted that virtual private network 100 may comprise any number of client nodes, e.g., 110B–D, and therefore any number of tunnels 120. It is further noted that virtual private network 100 may comprise any number of server nodes, e.g., 110A. It is further noted that virtual private network 100 may comprise any configuration and that FIG. 1 is used for illustrative purposes only.

Referring to FIG. 1, tunnel 120A is established between server node 110A and client node 110B. Tunnel 120B is established between server node 110A and client node 110C. Tunnel 120C is established between server node 110A and client node 110D.

Figure 2:
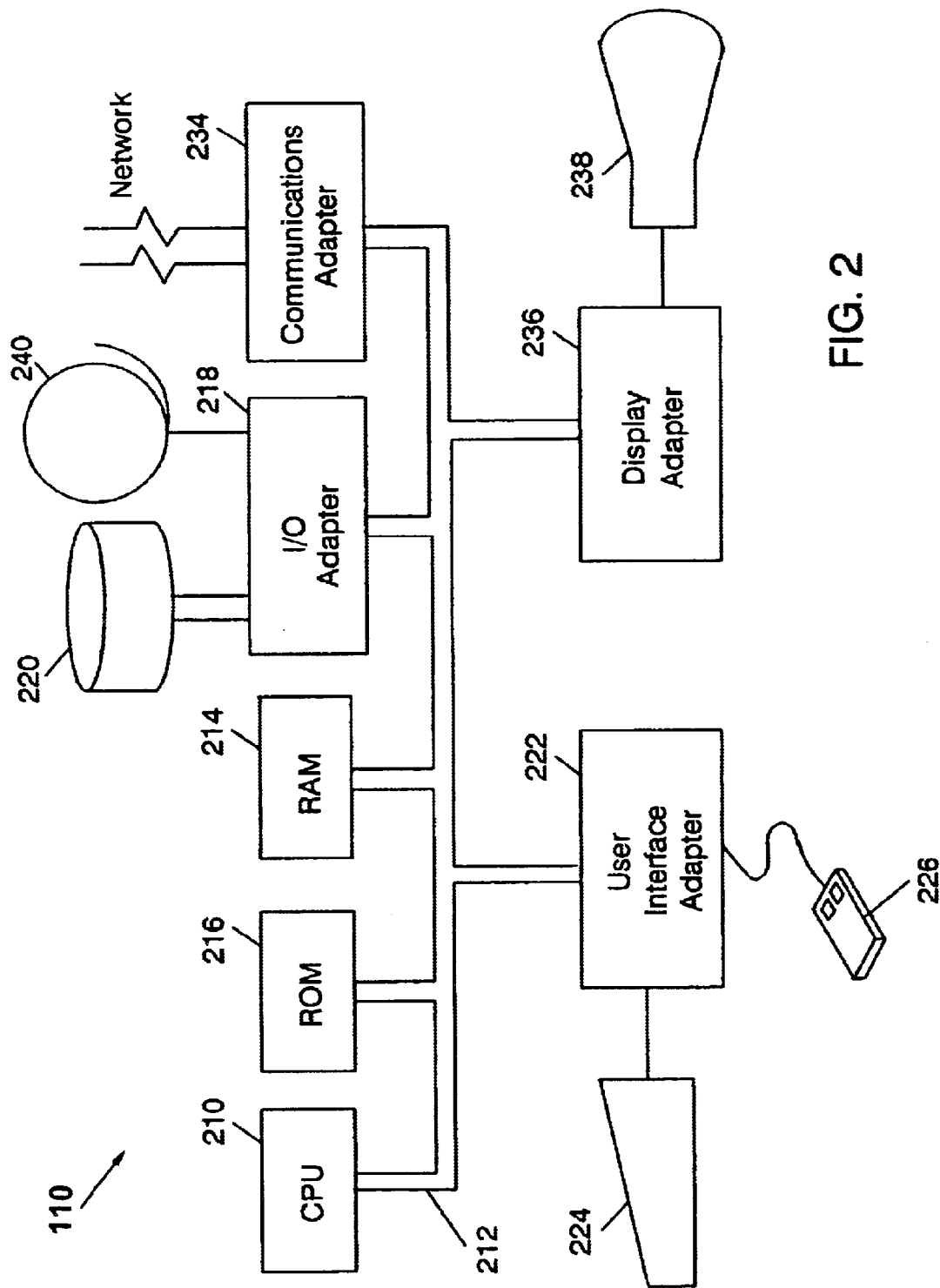
FIG. 2 illustrates an embodiment of a node of the virtual private network.

FIG. 2—Embodiment of a Node

FIG. 2 illustrates an embodiment of the present invention of node 110. It is noted that nodes 110 may exist in various embodiments and that FIG. 2 is used for illustrative purposes only. FIG. 2 illustrates a typical hardware configuration of node 110 which may be representative of a hardware environment for practicing the present invention. Node 110 has a central processing unit (CPU) 210, such as a conventional microprocessor, coupled to various other components by system bus 212. Read only memory (ROM) 216 is coupled to system bus 212 and includes a basic input/output system ("BIOS") that controls certain basic functions of node 110. Random access memory (RAM) 214, I/O adapter 218, and communications adapter 234 are also coupled to system bus 212. RAM 214 typically provides age of information, such as executable processes and contents of data packets transferred through node 110. An operating system, portions of which are typically resident in RAM 214 or ROM 216 and executed by CPU 210, functionally organizes node 110 by, inter alia, invoking network operations in support of those processes executing in CPU 210. I/O adapter 218 may be a small computer system interface ("SCSI") adapter that communicates with disk units 220 and tape drives 240. Communications adapter 234 interconnects bus 212 with an outside network enabling node 10 to communicate with another node 10 thereby establishing a tunnel in a virtual private network. Input/Output devices may also be connected to system bus 212 via a user interface adapter 222 and a display adapter 236. A display monitor 238 is connected to system bus 212 by display adapter 236. In this manner, a user is capable of inputting to node 10 through a keyboard 224 or a mouse 226 and receiving output from node 110 via display 38.

FIG. 3—Method for Establishing Server Node With the Same Tunnel Definition and the Same Security Policy for Multiple Tunnels Associated With a Group FIG. 3 illustrates a flowchart of one embodiment of the present invention of a method 300 for developing a virtual private network where the server node has one security policy and one tunnel definition associated with a plurality of tunnels where the plurality of tunnels are associated with a group, i.e., group of users. A plurality of tunnels, e.g., 120A–C, may be associated with a group of users where each user in the group has access to one of the plurality of tunnels 120. As stated in the Background Information section, prior art virtual private networks, VPN's create a security policy and a tunnel definition in the server node for each of the plurality of tunnels connected to the server node thereby resulting in a large number of security policies to be created and maintained for the many users of resources on a network. Method 300 creates a concept of a "group" where each of a plurality of tunnels 120 is associated with a member, i.e., user, of a group. Server node 110A may then have one security policy and one tunnel definition for each of the plurality of tunnels 120 associated with the group as will be described below. Furthermore, method 300 allows a non-contiguous set of ID types, e.g., Internet Protocol addresses, User@FQDN, FQDN, and X.500 Distinguished Name, to be defined as a group to be associated with a plurality of tunnels 120. A detailed explanation of method 300 is provided below.

In step 310, a group database in the server node 110A is configured so that a list of members, i.e., users, are associated with a particular group name. The group database defines a group, i.e., a group of users associated with a particular group, where each member of that group has access to one of a plurality of tunnels 120 associated with a group. In an embodiment of the present invention, the group database defines the group name as well as all the users associated with that particular group. For example, a group may have the name of "engineers_project1." The group database would then have a list of users associated with the group, e.g., all engineers working on project 1.

An example of an embodiment of a group database in the server node 110A is provided in FIG. 5. In FIG. 5, group database 510 comprises a group name, the ID's of all the members of the particular group and the ID types of all the members of the particular group, e.g., Internet Key Exchange (IKE) defined ID types such as Internet Protocol addresses, User@FQDN, FQDN, and X.500 Distinguished Name. In another embodiment, the ID's of all the members of the particular group may be explicit or wildcarded. In another embodiment, the IDs of the members of the group may be specified by any name by a user. For example, the ID may be the login ID of the user on the system, such as "bob", so that a system administrator could easily identify who has access to a specific tunnel 120 by viewing the IDs in the group. In another embodiment, the member ID types may be a non-contiguous set of addresses associated with a group where each member, i.e., user, of the group has access to a particular tunnel 120.

In one embodiment, the group database in the server node 110A may be configured by a user entering the group name, ID type of each member of the particular group, e.g., IKE defined ID types such as Internet Protocol addresses, User@FQDN, FQDN, and X.500 Distinguished Name, and the ID's of all the members of the particular group through a graphical user interface (GUI). In another embodiment, the group database in the server node 110A may be configured by a user entering the group name, ID type of each member of the particular group, e.g., IKE defined ID types such as Internet Protocol addresses, User@FQDN, FQDN, and X.500 Distinguished Name, and the ID's of all the members of the particular group through a command line interface. In another embodiment, the group database in the server node 110A may be configured by a user entering the group name, ID type of each member of the particular group, e.g., IKE defined ID types such as Internet Protocol addresses, User@FQDN, FQDN, and X.500 Distinguished Name, and the ID's of all the members of the particular group through configuration files. Typically the group database resides on disk, e.g., disk 220 of node 110. It is noted that the members of a particular group name may be added, deleted or updated. It is further noted that the group database may only be defined in the server node 110A and not in the client nodes, e.g., 110B–D.

In step 320, a rules database in the server node 110A is configured so that the particular group name is associated with a particular type of security policy defined in a policy database in the server node 110A. Since the group name is associated with a particular type of security policy, the server node 110A assigns the same security policy for each of the plurality of tunnels associated with the group name. An example of an embodiment of a rules database is provided in FIG. 5. In FIG. 5, rules database 520 comprises a remote ID, e.g., group name, remote ID type, e.g., group name ID type, and At a security policy pointer which points to the particular security policy defined in the policy database. The remote ID and remote ID type refers to the ID and ID type of the nodes on the opposite end of the tunnels, e.g., client nodes, associated with a group name as a group. Typically, the policy database resides on disk, e.g., disk 220, of node 110A. In one embodiment, the rules database in server node 110A may be configured by a user entering the remote ID, e.g., group name, the remote ID) type, e.g., group name ID type, and the security policy pointer through a graphical user interface (GUI). In another embodiment, the rules database in server node 110A may be configured by a user entering the remote ID, e.g., group name, the remote ID type, e.g., group name ID type, and the security policy pointer through a command line interface. In another embodiment, the rules database in server node 110A may be configured by a user entering the remote ID, e.g., group name, the remote ID type, e.g., group name ID type, and the security policy pointer through configuration files. Typically the rules database resides on disk, e.g., disk 220, of node 110A. It is noted each of the client nodes, e.g., 110B–D, has a rules database as well. The rules database may comprise a remote ID, e.g., VPN server, a remote ID type and a security policy pointer which points to the particular security policy defined in the policy database of the client node, e.g., 110B. It is further noted that the rules database in the client nodes, e.g., 110B–D, may be similarly configured as the rules database in the server node 110A.

In step 330, a tunnel definition database in the server node 110A is configured so that the server node 110A has one tunnel definition for each of the plurality of tunnels 120 associated with a group name. As stated in the Background Information section, the tunnel definition establishes the end points of that particular tunnel 120. An example of an embodiment of a tunnel definition database is provided in FIG. 5. In FIG. 5, tunnel definition database 530 in server node 110A comprises the local ID, the local ID type, the remote ID and the remote ID type. The local ID and local ID type refers to the ID and ID type, e.g., IKE defined ID types such as Internet Protocol addresses, User@FQDN, FQDN, and X.500 Distinguished Name, of the server node 110A The remote ID and remote ID type refers to the ID and ID type, e.g., IKE defined ID types such as Internet Protocol addresses, User@FQDN, FQDN, and X.500 Distinguished Name, of the client node, e.g., 110B. By defining the local ID, the local ID type, the remote ID and the remote ID type, a tunnel 120 is defined between the nodes 110 associated with the local ID and remote ID. That is, the end points of a particular tunnel 120 are established.

In one embodiment, the tunnel definition database in the server node 110A may be configured by a user entering the local ID, the local ID type, the remote ID and the remote ID type through a GUI. In another embodiment, the tunnel definition database in the server node 110A may be configured by a user entering the local ID, the local ID type, the remote ID and the remote ID type through a command line interface. In another embodiment, the tunnel definition database in the server node 110A may be configured by a user entering the local ID, the local ID type, the remote ID and the remote ID type through configuration files. Typically the tunnel definition database resides on disk, e.g., disk 220, of server node 110A. It is noted each of the client nodes, e.g., 110B–D, has a tunnel definition database as well. The tunnel definition database may comprise a local ID, a local ID type, a remote ID and a remote ID type. It is further noted that the tunnel definition database in the client nodes, e.g., 110B–D, may be similarly configured as the tunnel definition database in the server node 110A.

As stated above, a tunnel definition database in the server node 110A is configured so that the server node 110A has one tunnel definition for each of the plurality of tunnels 120 associated with a group name. The server node 110A has the same tunnel definition for each of the plurality of tunnels 120 associated with a group name by defining the remote ID of the server node 110A as the same particular group name. For example, referring to FIG. 5, tunnel definition database 530 assigns the remote ID as a group name, e.g., VPNA The remote ID type is a group. The local ID and local ID type is the ID and ID type of the server node 110A.

In step 340, a particular tunnel 120 of the plurality of tunnels 120 associated with a member of a particular group is activated. The particular tunnel is activated through a protocol, Internet Key Exchange (IKE), that is used to establish security associations that are needed by various services, e.g., IPSec uses IKE to establish the security associations needed to generate and refresh its keys.

The VPN security policy typically describes the characteristics of the protection for a particular traffic profile. That is, the VPN security policy describes the protection of the flow of data between the plurality of nodes 110 establishing the tunnel 120 of the virtual private network. Furthermore, the VPN security policy describes how the traffic is to be protected, e.g., authentication, encryption, transforms, key lengths and lifetimes, etc. VPN policies can be defined per node 110 but can be implemented in a centralized directory to provide better scalability and management. Essentially both nodes 110 establishing the tunnel need to have matching policies for the same traffic profile before such traffic can be allowed to flow between the nodes 110, i.e., communicating between the nodes 110. One node 110 may have a policy that is more granular or restrictive than the other node as long as both nodes 110 agree on the same set of protection suites at any point in time. Typically the security policy is stored in a policy database which resides on disk, e.g., disk 220, of node 110.

In one embodiment, the policy database in the server node 110A and in the plurality of client nodes, e.g., 110B–D, may be configured by a user entering a security policy through a GUI at each respective node 110. In another embodiment, the policy database in the server node 110A and in the plurality of client nodes, e.g., 110B–D, may be configured by a user entering a security policy through a command line interface at each respective node 110. In another embodiment, the policy database in the server node 110A and in the plurality of client nodes, e.g., 110B–D, may be configured by a user entering a security policy through configuration files at each respective node 110.

As stated above, IKE is used to establish security associations in order to activate a particular tunnel 120. IKE is made up of two phases defined within an Internet Security Association and Key Management Protocol (ISAKMP) framework. The ISAKMP framework establishes the security associations and cyrptographic keys. The first phase establishes the security associations between the plurality of nodes 110 establishing a particular tunnel. IKE assumes that no secure channel, i.e., tunnel, currently exists and therefore it must initially establish one to protect any ISAKMP messages. The second phase refers to the negotiation of the security association for Internet Protocol (IP) security. Upon the successful completion of the negotiation of the phase two security association, data may be transferred between the plurality of nodes 110 establishing the tunnel 120.

Figure 4:
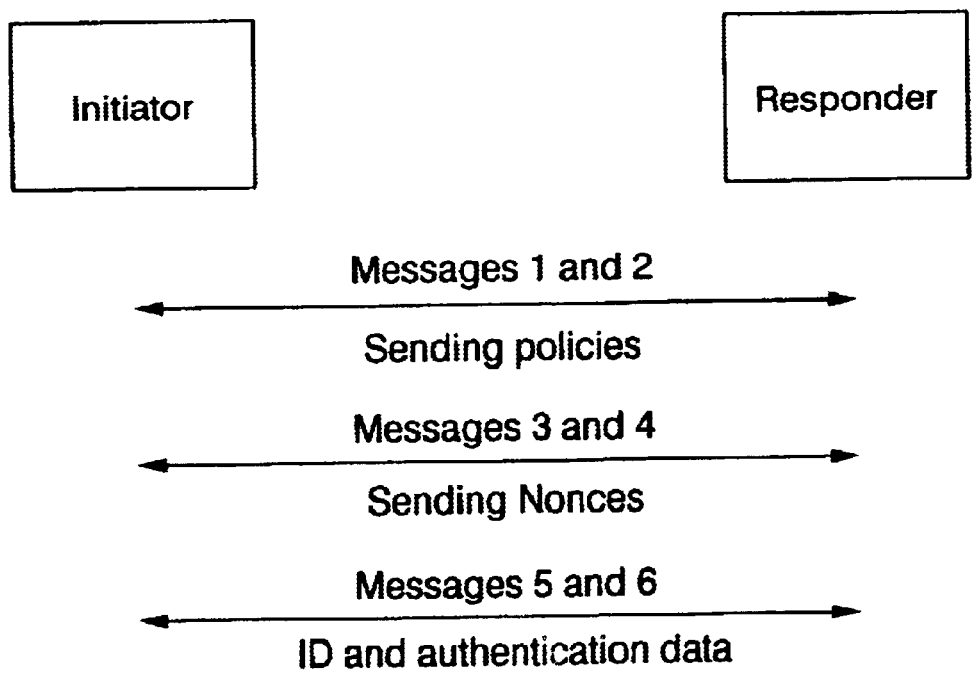
FIG. 4 illustrates an embodiment of establishing an ISAKMP security association between the server and client node establishing a particular tunnel.

In one embodiment, an ISAKMP security association may be established between the nodes 110 of a particular tunnel 120, i.e., first phase of IKE, in the following manner 110 through the exchange of six messages as illustrated in FIG. 4. FIG. 4 illustrates the flow of messages from the initiator node 110 to the responding node 110. The initiator node 110 is the node 110 that initiates sending messages or data in the tunnel 120. The responder node 110 is the node 110 that responds to the messages and data sent by the initiator node 110 across the tunnel 120. An example of a responder node 110 maybe the server node 110A of FIG. 1. An example of an initiator node 110 may be any of the client nodes, e.g., nodes 110B–D of FIG. 1. In the first message, the initiator node 110 transfers its security policy to the responding node 110. The responding node 110 transfers its security policy to the initiator node 110 in the second message if the security policy of the responding node 110 matches the security policy of the initiator node 110. In another embodiment, the responding node 110 transfers its security policy to the initiator node 110 in the second message if both nodes 110 agree on the same set of protection suites in their security policy at any point in time. Additionally, cookies are generated to incorporate into the ISAKMP header in the first and second message. Cookies ensure protection against denial of service attacks and the pair of cookies (the initiator's cookie and responder's cookie) identify the ISAKMP security association.

In the third message, the initiator node 110 transfers a nonce, i.e., random number, to the responder node 110 that is used to generate key material for the responder. The responder node 110 transfers a nonce, i.e., random number, to the initiator node 110 in the fourth message that is used to generate key material for the initiator. Since both the initiator and responder node 110 possess the same mathematical algorithm, the initiator and responder node 110 will have the same key material. All ISAKMP messages from this point are then encrypted.

In the fifth message, the initiator node 110 transfers the ID of a particular member of a particular group name to the responder node 110 and through an authentication method, e.g., preshared key, the initiator node 110 is authenticated. In the sixth message, the responder node 110 transfers an ID of the responder node 110 to the initiator node 110 and through an authentication method, e.g., preshared key, the responder node 110 is authenticated. For example, if a security association is being established for tunnel 120A, then client node, e.g., 110B, the initiator node, may transfer the ID of a particular member of a particular group name as the fifth message to the server node 110A. The server node 110A, the responder node, may then transfer the ED of the responder node in the sixth message to the client node, e.g., 110B. Subsequently, tunnel 120A is associated with the particular member of the particular group name.

Upon completion of the first and second phase of IKE, the particular tunnel 120 established by the tunnel definition database at each respective node, e.g., 110A and 110B, associated with a particular member of a particular group is activated. That is, the particular member of the particular group associated with that tunnel 120 may use that tunnel 120. It is noted that the type of tunnel 120 established and activated using an IKE protocol as described above is commonly referred to as an IKE tunnel.

In step 350, data is transferred across the IKE tunnel between the plurality of nodes establishing the IKE tunnel in a secure private connection.

Although the method, network system and computer program product of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for allowing a server node in a virtual private network to have a single tunnel definition and a single security policy for a plurality of tunnels associated with a group name comprising the steps of:

configuring a group database in said server node, wherein said group database in said server node comprises said group name and a list of members associated with said group name;

configuring a rules database in said server node, wherein said rules database associates said group name with a particular security policy, wherein said server node has a single security policy for each of the plurality of tunnels associated with said group name;

establishing a tunnel having a tunnel definition between a client node having a member name and said server node by negotiating a common security policy; and associating said tunnel with a group in said group database based on said member name such that only one copy of said tunnel definition and associated security policy is maintained on said server node regardless of the number of client nodes to server node tunnels associated with said group.

2. The method as recited in claim 1 further comprising the step of:

configuring a tunnel definition database in said server node, wherein a remote ID in said tunnel definition is defined as said group name, wherein said server node has a single tunnel definition for each of the plurality of tunnels associated with said group name.

3. The method as recited in claim 1, wherein said list of members associated with said group name comprise an ID type and an ID of each member associated with said group name.

4. The method as recited in claim 3, wherein said ID type is an Internet Key Exchange (IKE) defined ID type, wherein said list of members is a non-contiguous list of IKE defined ID types.

5. The method as recited in claim 3, wherein said ID is a login ID.

6. The method as recited in claim 3, wherein said ID is a specified name.

7. The method as recited in claim 2, wherein configuring said tunnel definition database in said server node comprises establishing said server node and said client node as the two end points of said tunnel.

8. The method as recited in claim 7, wherein said tunnel definition database in said server node is configured by a user entering a local ID, a local ID type, said remote ID and a remote ID type through a GUI.

9. The method as recited in claim 7, wherein said tunnel definition database in said server node is configured by a user entering a local ID, a local ID type, said remote ID and a remote ID type through a command line interface.

10. The method as recited in claim 1, wherein said group database in said server node comprises said group name and an ID type of each member of said group name and an ID of each member of said group name.

11. The method as recited in claim 10, wherein configuring said group database in said server node is accomplished by entering said group name, said ID type of each member of said group name and said ID of each member of said group name through a GUI.

12. The method as recited in claim 10, wherein configuring said group database in said server node is accomplished by entering said group name, said ID type of each member of said group name and said ID of each member of said group name through a command line interface.

13. The method as recited in claim 10, wherein configuring said group database in said server node is accomplished by entering said group name, said ID type of each member of said group name and said ID of each member of said group name through configuration files.

14. The method as recited in claim 1, wherein said rules database in said server node comprises said group name, a group name ID type and a security policy pointer.

15. The method as recited in claim 14, wherein configuring said rules database in said server node is accomplished by entering said group name, said group name ID type and said security policy pointer through a GUI.

16. The method as recited in claim 14, wherein configuring said rules database in said server node is accomplished by entering said group name, said group name ID type and said security policy pointer through a command line interface.

17. A method for allowing a server node in a virtual private network to have a single tunnel definition and a single security policy for a plurality of tunnels associated with a group name comprising the steps of:
configuring a group database in said server node, wherein said group database in said server node comprises said group name and a list of members associated with said group name;
configuring a rules database in said server node, wherein said rules database associates said group name with a particular security policy, wherein said server node has a single security policy for each of the plurality of tunnels associated with said group name;
establishing a tunnel having a tunnel definition between a client node having a member name and said server node by negotiating a common security policy;
associating said tunnel with a group in said group database based on said member name such that only one copy of said tunnel definition and associated security policy is maintained on said server node regardless of the number of client nodes to server node tunnels associated with said group; and
activating said tunnel, wherein activating said tunnel comprises the steps of:
sending a security policy stored in a policy database of said client node by said client node to said server node;
sending a security policy stored in a policy database of said server node by said server node to said client node if said security policy stored in said policy database of said server node matches said security policy stored in said policy database of said client node;
sending a first nonce by said client node to said server node;
sending a second nonce by said server node to said client node;
sending a first ID by said client node to said server node; and
sending a second ID by said server node to said client node.

18. The method as recited in claim 17, wherein said first and second nonce are used to generate key material for said server and client node, respectively.

19. The method as recited in claim 17, wherein said policy database in said client and server node are configured by entering said security policy through a GUI at said client and server node.

20. The method as recited in claim 17, wherein said policy database in said client and server node are configured by entering said security policy through a command line interface at said client and server node.

21. The method as recited in claim 17, wherein said first ID is an ID of said particular member of said group name.

22. A method for allowing a server node in a virtual private network to have a single tunnel definition and a single security policy for a plurality of tunnels associated with a soup name comprising the steps of:
configuring a group database in said server node, wherein said group database in said server node comprises said group name and a list of members associated with said group name;
configuring a rules database in said server node, wherein said rules database associates said group name with a particular security policy, wherein said server node has a single security policy for each of the plurality of tunnels associated with said group name;
establishing a tunnel having a tunnel definition between a client node having a member name and said server node by negotiating a common security policy;
associating said tunnel with a group in said group database based on said member name such that only one copy of said tunnel definition and associated security policy is maintained on said server node regardless of the number of client nodes to server node tunnels associated with said group; and activating said tunnel, wherein activating tunnel comprises the steps of:
sending a security policy stored in a policy database of said client node by said client node to said server node;
sending a security policy stored in a policy database of said server node by said server node to said client node if said security policy stored in said policy database of said server node agrees on the same set of protection suites at any point in time with said security policy stored in said policy database of said client node;
sending a first nonce by said client node to said server node;
sending a second nonce by said server node to said client node;
sending a first ID by said client node to said server node; and
sending a second ID by said server node to said client node.

23. A virtual private network system comprising: a plurality of tunnels associated with a group name, wherein each of said plurality of tunnels associated with said group name comprises a plurality of nodes, wherein each of said plurality of nodes comprises a communication adapter to interconnect with said virtual private network, wherein one of said plurality of nodes is a server node, wherein one of said plurality of nodes is a client node, wherein said server node comprises: a group database, wherein said group database comprises said group name and a list of members associated with said group name; and a rules database, wherein said rules database associates said group name with a particular security policy, wherein said server node has a single copy of a security policy for each of the plurality of tunnels associated with said group name.

24. The virtual private network system as recited in claim 23, wherein said server node further comprises: a tunnel definition database, wherein a remote ID in said tunnel definition is defined as said group name, wherein said server node has a single tunnel definition for each of the plurality of tunnels associated with said group name.

25. The virtual private network system as recited in claim 24, wherein a particular tunnel of said plurality of tunnels associated with said group name is activated, wherein said particular tunnel is associated with a particular member of said group name.

26. The virtual private network system as recited in claim 23, wherein said list of members associated with said group name comprise an ID type and an ID of each member associated with said group name.

27. The virtual private network system as recited in claim 26, wherein said ID type is an Internet Key Exchange (IKE) defined ID type, wherein said list of members is a non-contiguous list of IKE defined ID types.

28. The virtual private network system as recited in claim 26, wherein said ID is a login ID.

29. The virtual private network system as recited in claim 26, wherein said ID is a specified name.

30. The virtual private network system as recited in claim 24, wherein said tunnel definition database in said server node is configured by a user entering a local ID, a local ID type, said remote ID and a remote ID type through a GUI.

31. The virtual private network system as recited in claim 24, wherein said tunnel definition database in said server node is configured by a user entering a local ID, a local ID type, said remote ID and a remote ID type through a command line interface.

32. The virtual private network system as recited in claim 23, wherein said group database in said server node comprises said group name and an ID type of each member of said group name and an ID of each member of said group name.

33. The virtual private network system as recited in claim 32, wherein said group database in said server node is configured by a user entering said group name, said ID type of each member of said group name and said ID of each member of said group name through a GUI.

34. The virtual private network system as recited in claim 32, wherein said group database in said server node is configured by a user entering said group name, said ID type of each member of said group name and said ID of each member of said group name through a command line interface.

35. The virtual private network system as recited in claim 32, wherein said group database in said server node is configured by a user entering said group name, said ID type of each member of said group name and said ID of each member of said group name through configuration files.

36. The virtual private network system as recited in claim 23, wherein said rules database in said server node comprises said group name, a group name ID type and a security policy pointer.

37. The virtual private network system as recited in claim 36, wherein said rules database is configured by a user entering said group name, said group name ID type and said security policy pointer through a GUI.

38. The virtual private network system as recited in claim 37, wherein said rules database is configured by a user entering said group name, said group name ID type and said security policy pointer through a command line interface.

39. A virtual private network system comprising: a plurality of tunnels associated with a group name, wherein each of said plurality of tunnels associated with said group name comprises a plurality of nodes, wherein each of said plurality of nodes comprises a communication adapter to interconnect with said virtual private network, wherein one of said plurality of nodes is a server node, wherein one of said plurality of nodes is a client node, wherein said server node comprises: a group database, wherein said group database comprises said group name and a list of members associated with said group name; and a rules database, wherein said rules database associates said group name with a particular security policy, wherein said server node has a single copy of a security policy for each of the plurality of tunnels associated with said group name; wherein the server node further comprises; a tunnel definition database, wherein a remote ID in said tunnel definition is defined as said group name, wherein said server node has a single tunnel definition for each of the plurality of tunnels associated with said group name; wherein a particular tunnel of said plurality of tunnels associated with said group name is activated, wherein said particular tunnel is associated with a particular member of said group name; wherein activating said particular tunnel comprises the steps of: sending a security policy stored in a policy database of said client node by said client node to said server node; sending a security policy stored in a policy database of said server node by said server node to said client node if said security policy stored in said policy database of said server node matches said security policy stored in said policy database of said client node; sending a first nonce by said client node to said server node; sending a second nonce by said server node to said client node; sending a first ID by said client node to said server node; and sending a second ID by said server node to said client node.

40. The virtual private network system as recited in claim 39, wherein said first and second nonce are used to generate key material for said server and client node, respectively.

41. The virtual private network system as recited in claim 39, wherein said policy database in said client and server node are configured by entering said security policy through a GUI at said client and server node.

42. The virtual private network system as recited in claim 39, wherein said policy database in said client and server node are configured by entering said security policy through a command line interface at said client and server node.

43. The virtual private network system as recited in claim 39, wherein said first ID is an ID of said particular member of said group name.

44. A virtual private network system comprising: a plurality of tunnels associated with a group name, wherein each of said plurality of tunnels associated with said group name comprises a plurality of nodes, wherein each of said plurality of nodes comprises a communication adapter to interconnect with said virtual private network, wherein one of said plurality of nodes is a server node, wherein one of said plurality of nodes is a client node, wherein said server node comprises: a group database, wherein said group database comprises said group name and a list of members associated with said group name; and a rules database, wherein said rules database associates said group name with a particular security policy, wherein said server node has a single copy of a security policy for each of the plurality of tunnels associated with said group name; wherein the server node further comprises; a tunnel definition database, wherein a remote ID in said tunnel definition is defined as said group name, wherein said server node has a single tunnel definition for each of the plurality of tunnels associated with said group name; wherein a particular tunnel of said plurality of tunnels associated with said group name is activated, wherein said particular tunnel is associated with a particular member of said group name; wherein activating said particular tunnel comprises the steps of sending a security policy stored in a policy database of said client node by said client node to said server node; sending a security policy stored in a policy database of said server node by said server node to said client node if said security policy stored in said policy database of said server node agrees on the same set of protection suites at any point in time with said security policy stored in said policy database of said client node; sending a first nonce by said client node to said server node; sending a second nonce by said server node to said client node; sending a first ID by said client node to said server node; and sending a second ID by said server node to said client node.

45. A computer program product having a computer readable medium having computer program logic recorded thereon for allowing a server node in a virtual private network to have a single tunnel definition and a single security policy for a plurality of tunnels associated with a group name, comprising:
programming operable for configuring a group database in said server node, wherein said group database in said server node comprises said group name and a list of members associated with said group name;
programming operable for configuring a rules database in said server node, wherein said rules database associates said group name with a particular security policy, wherein said server node has a single security policy for each of the plurality of tunnels associated with said group name;
programming operable for establishing a tunnel having a tunnel definition between a client node having a member name and said server node by negotiating a common security policy; and
programming operable for associating said tunnel with a group in said group database based on said member name such that only one copy of said tunnel definition and associated security policy is maintained on said server node regardless of the number of client nodes to server node tunnels associated with said group.

46. The computer program product as recited in claim 45 further comprises:
programming operable for configuring a tunnel definition database in said server node, wherein a remote ID in said tunnel definition is defined as said group name, wherein said server node has a single tunnel definition for each of the plurality of tunnels associated with said group name.

47. The computer program product as recited in claim 45, wherein said list of members associated with said group name comprise an ID type and an ID of each member associated with said group name.

48. The computer program product as recited in claim 47, wherein said ID type is an Internet Key Exchange (IKE) defined ID type, wherein said list of members is a non-contiguous list of IKE defined ID types.

49. The computer program product as recited in claim 47, wherein said ID is a login ID.

50. The computer program product as recited in claim 47, wherein said ID is a specified name.

51. The computer program product as recited in claim 46, wherein configuring said tunnel definition database in said server node comprises:
programming operable for establishing said server node and said client node as the two end points of said tunnel.

52. The computer program product as recited in claim 51, wherein said tunnel definition database in said server node is configured by a user entering a local ID, a local ID type, said remote ID and a remote ID type through a GUI.

53. The computer program product as recited in claim 51, wherein said tunnel definition database in said server node is configured by a user entering a local ID, a local ID type, said remote ID and a remote ID type through a command line interface.

54. The computer program product as recited in claim 45, wherein said group database in said server node comprises said group name and an ID type of each member of said group name and an ID of each member of said group name.

55. The computer program product as recited in claim 54, wherein configuring said group database in said server node is accomplished by entering said group name, said ID type of each member of said group name and said ID of each member of said group name through a GUI.

56. The computer program product as recited in claim 54, wherein configuring said group database in said server node is accomplished by entering said group name, said ID type of each member of said group name and said ID of each member of said group name through a command line interface.

57. The computer program product as recited in claim 54, wherein configuring said group database in said server node is accomplished by entering said group name, said ID type of each member of said group name and said ID of each member of said group name through configuration files.

58. The computer program product as recited in claim 45, wherein said rules database in said server node comprises said group name, a group name ID type and a security policy pointer.

59. The computer program product as recited in claim 58, wherein configuring said rules database in said server node is accomplished by entering said group name, said group name ID type and said security policy pointer through a GUI.

60. The computer program product as recited in claim 58, wherein configuring said rules database in said server node is accomplished by entering said group name, said group name ID type and said security policy pointer through a command line interface.

61. A computer program product having a computer readable medium having computer program logic recorded thereon for allowing a server node in a virtual private network to have a single tunnel definition and a single security policy for a plurality of tunnels associated with a group name, comprising:

programming operable for configuring a group database in said server node, wherein said group database in said server node comprises said group name and a list of members associated with said group name;

programming operable for configuring a rules database in said server node, wherein said rules database associates said group name with a particular security policy, wherein said server node has a single security policy for each of the plurality of tunnels associated with said group name;

programming operable for establishing a tunnel having a tunnel definition between a client node having a member name and said server node by negotiating a common security policy;

programming operable for associating said tunnel with a group in said group database based on said member name such that only one copy of said tunnel definition and associated security policy is maintained on said server node regardless of the number of client nodes to server node tunnels associated with said group; and programming operable for activating said tunnel, wherein said programming operable for activating said tunnel comprises:

programming operable for sending a security policy stored in a policy database of said client node by said client node to said server node;

programming operable for sending a security policy stored in a policy database of said server node by said server node to said client node if said security policy stored in said policy database of said server node matches said security policy stored in said policy database of said client node;

programming operable for sending a first nonce by said client node to said server node;

programming operable for sending a second nonce by said server node to said client node;

programming operable for sending a first ID by said client node to said server node; and programming operable for sending a second ID by said server node to said client node.

62. The computer program product as recited in claim 61, wherein said first and second nonce are used to generate key material for said server and client node, respectively.

63. The computer program product as recited in claim 61, wherein said policy database in said client and server node are configured by entering said security policy through a GUI at said client and server node.

64. The computer program product as recited in claim 61, wherein said policy database in said client and server node are configured by entering said security policy through a command line interface at said client and server node.

65. The computer program product as recited in claim 61, wherein said first ID is an ID of said particular member of said group name.

66. A computer program product having a computer readable medium having computer program logic recorded thereon for allowing a server node in a virtual private network to have a single tunnel definition and a single security policy for a plurality of tunnels associated with a group name, comprising:

programming operable for configuring a group database in said server node, wherein said group database in said server node comprises said group name and a list of members associated with said group name;

programming operable for configuring a rules database in said server node, wherein said rules database associates said group name with a particular security policy, wherein said server node has a single security policy for each of the plurality of tunnels associated with said group name;

programming operable for establishing a tunnel having a tunnel definition between a client node having a member name and said server node by negotiating a common security policy;

programming operable for associating said tunnel with a group in said group database based on said member name such that only one copy of said tunnel definition and associated security policy is maintained on said server node regardless of the number of client nodes to server node tunnels associated with said group; and programming operable for activating said tunnel, wherein said programming operable for activating said tunnel comprises:

programming operable for sending a security policy stored in a policy database of said client node by said client node to said server node;

programming operable for sending a security policy stored in a policy database of said server node by said server node to said client node if said security policy stored in said policy database of said server node agrees on the same set of protection suites at any point in time with said security policy stored in said policy database of said client node;

programming operable for sending a first nonce by said client node to said server node;

programming operable for sending a second nonce by said server node to said client node;

programming operable for sending a first ID by said client node to said server node; and programming operable for sending a second ID by said server node to said client node.

\* \* \* \* \*

UNITED STATES PATENT AND TRADEMARK OFFICE
CERTIFICATE OF CORRECTION

PATENT NO. : 6,823,462 B1
DATED : November 23, 2004
INVENTOR(S) : Pau-Chen Cheng et al.

It is certified that error appears in the above-identified patent and that said Letters Patent is hereby corrected as shown below:

Column 7,
Line 34, please delete "110".

Column 13,
Line 38, following "of" please insert -- : --.

Signed and Sealed this

Tenth Day of May, 2005

JON W. DUDAS
*Director of the United States Patent and Trademark Office*